(12) United States Patent
Idesawa et al.

(10) Patent No.: US 11,475,371 B2
(45) Date of Patent: Oct. 18, 2022

(54) LEARNED MODEL INTEGRATION METHOD, APPARATUS, PROGRAM, IC CHIP, AND SYSTEM

(71) Applicant: AlSing LTD., Tokyo (JP)

(72) Inventors: Junichi Idesawa, Tokyo (JP); Shimon Sugawara, Tokyo (JP)

(73) Assignee: AISing LTD., Tokyo (JP)

( * ) Notice: Subject to any disclaimer, the term of this patent is extended or adjusted under 35 U.S.C. 154(b) by 768 days.

(21) Appl. No.: 16/232,333

(22) Filed: Dec. 26, 2018

(65) Prior Publication Data

US 2019/0138936 A1 May 9, 2019

Related U.S. Application Data

(63) Continuation of application No. PCT/JP2018/027774, filed on Jul. 24, 2018.

(30) Foreign Application Priority Data

Jul. 31, 2017 (JP) .............................. JP2017-148319

(51) Int. Cl.
  *G06F 16/90* (2019.01)
  *G06N 20/20* (2019.01)
  (Continued)

(52) U.S. Cl.
  CPC ......... *G06N 20/20* (2019.01); *G06F 16/9027* (2019.01); *G06N 5/003* (2013.01)

(58) Field of Classification Search
  None
  See application file for complete search history.

(56) References Cited

U.S. PATENT DOCUMENTS 7,293,000 B2 * 11/2007 Lee .................. G06N 5/025
  706/12
7,480,640 B1 * 1/2009 Elad .................. G06Q 10/10
  706/14

(Continued)

FOREIGN PATENT DOCUMENTS

JP 2016-173686 A 9/2016

OTHER PUBLICATIONS

Extended European search report with supplementary European search report and the European search opinion issued by the European Patent Office for corresponding European Patent Application No. 18815931.3-1203, dated Apr. 6, 2021.

(Continued)

*Primary Examiner* — Maikhanh Nguyen
(74) *Attorney, Agent, or Firm* — Myers Wolin, LLC

(57) ABSTRACT

A learned model integration method for integrating multiple different learned models obtained by letting a learning model learn a predetermined data group, the learning model having a tree structure in which multiple nodes associated with respective hierarchically divided state spaces are hierarchically arranged, the method includes: a data reading step of reading data related to the multiple different learned models from a predetermined memory unit; and an integrating step in which, for each node constituting a tree structure related to the multiple different learned models, when a node exists in only one learned model, the node is duplicated, and when nodes exist in corresponding positions in the multiple learned models, the corresponding nodes are integrated, thereby integrating the multiple different learned models into a single learned model.

8 Claims, 13 Drawing Sheets

(51) Int. Cl.
*G06F 16/901* (2019.01)
*G06N 5/00* (2006.01)

(56) References Cited

U.S. PATENT DOCUMENTS

| | | | | |
|---|---|---|---|---|
| 8,209,271 | B1* | 6/2012 | Lin | G06N 20/00 706/12 |
| 8,429,110 | B2* | 4/2013 | Cai | G06F 16/951 706/45 |
| 8,620,837 | B2* | 12/2013 | Ghani | G06N 20/00 706/12 |
| 9,489,630 | B2* | 11/2016 | Achin | G06N 5/04 |
| 10,867,251 | B2* | 12/2020 | Motohashi | G06N 20/20 |
| 2003/0163437 | A1* | 8/2003 | Lee | G06K 9/6282 706/47 |
| 2007/0239641 | A1* | 10/2007 | Ito | B25J 9/161 706/23 |
| 2010/0145902 | A1* | 6/2010 | Boyan | G06F 16/958 715/810 |
| 2011/0307436 | A1* | 12/2011 | Cai | G06F 16/322 706/48 |
| 2011/0313957 | A1* | 12/2011 | Ide | G01C 21/20 706/12 |
| 2013/0018825 | A1* | 1/2013 | Ghani | G06N 20/00 706/12 |
| 2013/0197890 | A1* | 8/2013 | Ide | G01C 21/3484 703/6 |
| 2014/0236875 | A1* | 8/2014 | Phillipps | G06F 16/957 706/12 |
| 2014/0358828 | A1* | 12/2014 | Phillipps | G06N 20/00 706/12 |
| 2014/0372346 | A1* | 12/2014 | Phillipps | G06N 20/00 706/12 |
| 2015/0339572 | A1* | 11/2015 | Achin | G06Q 10/06 706/46 |
| 2015/0379429 | A1* | 12/2015 | Lee | G06N 20/00 706/11 |
| 2018/0039905 | A1* | 2/2018 | Anghel | G06N 20/00 |
| 2018/0330262 | A1* | 11/2018 | Motohashi | G06N 7/005 |

OTHER PUBLICATIONS

Hall et al., "Combining Decision Trees Learned in Parallel", Distributed Data Mining Workshop at International Conference of Knowledge Discovery and Data Mining, 1998.

International Search Report issued by the Japan Patent Office for corresponding International Patent Application No. PCT/JP2018/027773, dated Oct. 2, 2018.

Kim et al., "Error-based prediction algorithm for a dynamical system learning tree", IPSJ SIG Technical Report, vol. 2017-MPS-112 No. 25, pp. 1-5, Feb. 28, 2017.

Otani et al, "Examination of partial solution in a symbiotic evolution for generating a decision tree", Technical Report of IEICE, vol. 103 No. 725, pp. 101-106, Mar. 9, 2004, with English abstract.

AlSing, "From Japan,' 'World's first' machine control AI DeepBinaryTree: DBT", pp. 1-28, Apr. 27, 2018, with partial English translation.

* cited by examiner

LEARNED MODEL INTEGRATION METHOD, APPARATUS, PROGRAM, IC CHIP, AND SYSTEM

CROSS REFERENCE TO RELATED APPLICATIONS

This application is a continuation application of International Patent Application No. PCT/JP2018/027774, filed Jul. 24, 2018 and claims priority to Japanese Patent Application No. 2017-148319, filed on Jul. 31, 2017, the entire contents of each are herein incorporated by reference.

TECHNICAL FIELD

The present invention relates to a learned model integration method, apparatus, program, IC chip, and system for performing integration processing of learned models generated by predetermined learning processing, and particularly to a learned model integration method, apparatus, program, IC chip, and system for performing integration of learned models having tree structures.

BACKGROUND ART

In recent years, the field of machine learning has attracted high attention due to drastic improvement of arithmetic functions of calculators and the like. Under such circumstances, the inventors of the present application have proposed a framework of new machine learning having a tree structure (Patent Literature 1).

FIG. 13 is an explanatory diagram showing the framework of the above-described new machine learning, that is, an explanatory diagram showing the structure of a learning tree. FIG. 13(a) shows the structure of a learning tree in the learning method, and FIG. 13(b) shows the image of the state space corresponding to the structure. As is clear from the drawing, in the learning tree structure, nodes corresponding to the respective hierarchically divided state spaces are arranged from the top node (starting node or root node) to the bottom node (terminal node or leaf node) in a tree shape or lattice shape. It should be noted that the drawing shows an example of the case where N is 2, d is 2, and n is 2 in the learning tree with N levels, d dimensions, and n divisions, and the numbers 1 to 4 representing the four terminal nodes in the first level of the learning tree shown in FIG. 13(a) correspond to the four state spaces shown in FIG. 13(b), respectively.

During learning processing using the above-mentioned learning tree, the input data are sequentially associated with the respective divided state spaces and are accumulated in the respective state spaces. At this time, when data are newly input to state spaces where no data existed, new nodes are sequentially generated. The predicted output is calculated by taking the arithmetic mean of the values or vectors of the data included in the respective state spaces after learning.

CITATION LIST

Patent Literature

Patent Literature 1: Japanese Patent Laid-Open No. 2016-173686

SUMMARY OF INVENTION

Technical Problem

Meanwhile, with the spread of machine learning in recent years, there has been a demand for generating a learned model that can integrate previously learned models and perform more comprehensive prediction.

However, it has been difficult to integrate learned models using conventional machine learning techniques such as neural networks, due to their natures.

An object of the present invention, which has been made under the technical background described above, is to provide an apparatus, method, program, IC chip, system, and the like for generating a single learned model by integrating multiple learned models obtained using a framework of new machine learning having a tree structure.

Other objects and effects of the present invention should be readily understood by those skilled in the art by referring to the following statement of Description.

Solution to Problem

The above-mentioned technical problem can be solved by an information processing apparatus having the following configuration.

In particular, a learned model integration method according to the present disclosure is a learned model integration method for integrating multiple different learned models obtained by letting a learning model learn a predetermined data group, the learning model having a tree structure in which multiple nodes associated with respective hierarchically divided state spaces are hierarchically arranged, the method comprising: a data reading step of reading data related to the multiple different learned models from a predetermined memory unit; and an integrating step in which, for each node constituting a tree structure related to the multiple different learned models, when a node exists in only one learned model, the node is duplicated, and when nodes exist in corresponding positions in the multiple learned models, the corresponding nodes are integrated, thereby integrating the multiple different learned models into a single learned model.

With such a configuration, different learned models can be integrated using suitability for integration of learned models having tree structures, so that a single learned model closer to perfection can be generated from multiple learned models that have been subjected to partial learning.

In the integrating step, when a node exists in only one learned model, the node and all the nodes below that node may be duplicated.

With such a configuration, when a certain node exists only in one of them, efficient integration processing can be performed taking advantage of the fact that the nodes below that node also exist only in the one of the learned models.

Each node of the multiple different learned models may be associated with a learning-related parameter generated in the process of the learning, and the number of pieces of data included in a state space corresponding to each node, and the integrating step may further comprise: a number of pieces of data adding step of adding, for integration of the nodes, the numbers of pieces of data related to multiple nodes to be integrated, and an error amount adding step of performing, for integration of the nodes, weighted addition on the learning-related parameters associated with multiple nodes to be integrated, according to the numbers of pieces of data.

With such a configuration, for integration of the nodes, weighted addition is performed according to the number of pieces of included data, so that learning-related parameters can be integrated according to the reliability.

The learning-related parameter may be generated in the process of the learning for each node and may be an error amount corresponding to prediction accuracy.

With such a configuration, integration of error amounts for integration of the nodes is performed according to the number of pieces of data, so that error amounts can be integrated according to the reliability.

The data reading step may further comprise a parameter file reading step of reading a parameter file including parameters corresponding to learning conditions of the learned models, and the learned model integration method may further comprise a determination step in which when predetermined parameters among the parameters corresponding to the respective learning conditions match, the integrating step is performed, and when the predetermined parameters do not match, the integrating step is not performed.

Such a configuration enables preliminary determination of whether or not the learned models can be integrated based on predetermined parameters in the parameter files including parameters corresponding to the learning conditions, so that only appropriate integration processing that satisfies the preconditions for integration can be performed.

In addition, the present disclosure can be regarded as a learned model integrating apparatus. In particular, a learned model integrating apparatus according to the present disclosure is a learned model integrating apparatus for integrating multiple different learned models obtained by letting a learning model learn a predetermined data group, the learning model having a tree structure in which multiple nodes associated with respective hierarchically divided state spaces are hierarchically arranged, the apparatus comprising: a data reading unit for reading data related to the multiple different learned models from a predetermined memory unit; and an integrating unit in which, for each node constituting a tree structure related to the multiple different learned models, when a node exists in only one learned model, the node is duplicated, and when nodes exist in corresponding positions in the multiple learned models, the corresponding nodes are integrated, thereby integrating the multiple different learned models into a single learned model.

In addition, the present disclosure can also be regarded as a learned model integrating program. In particular, a learned model integrating program according to the present disclosure is a learned model integrating program for making a computer function as a learned model integrating apparatus for integrating multiple different learned models obtained by letting a learning model learn a predetermined data group, the learning model having a tree structure in which multiple nodes associated with respective hierarchically divided state spaces are hierarchically arranged, the program comprising: a data reading step of reading data related to the multiple different learned models from a predetermined memory unit; and an integrating step in which, for each node constituting a tree structure related to the multiple different learned models, when a node exists in only one learned model, the node is duplicated, and when nodes exist in corresponding positions in the multiple learned models, the corresponding nodes are integrated, thereby integrating the multiple different learned models into a single learned model.

In addition, the present disclosure can also be regarded as an IC chip. An IC chip according to the present disclosure is an IC chip having a function of integrating multiple different learned models obtained by letting a learning model learn a predetermined data group, the learning model having a tree structure in which multiple nodes associated with respective hierarchically divided state spaces are hierarchically arranged, the IC chip comprising: a data reading unit for reading data related to the multiple different learned models from a predetermined memory unit; and an integrating unit in which, for each node constituting a tree structure related to the multiple different learned models, when a node exists in only one learned model, the node is duplicated, and when nodes exist in corresponding positions in the multiple learned models, the corresponding nodes are integrated, thereby integrating the multiple different learned models into a single learned model.

In addition, the present disclosure can also be regarded as a learned model integration processing system. In particular, an integration processing system according to the present disclosure is an integration processing system comprising: a learning apparatus layer including one or more learning apparatuses for performing learning processing based on a predetermined data group according to a learning model having a tree structure in which multiple nodes associated with respective hierarchically divided state spaces are hierarchically arranged, thereby generating learned models; and an integrating apparatus layer including one or more learned model integrating apparatuses that are connected to the learning apparatus layer via communication and integrate the learned models generated in the learning apparatuses, the learned model integrating apparatus comprising: a data reading unit for reading data related to the different learned models from a predetermined memory unit; and an integrating unit in which, for each node constituting a tree structure related to the different learned models, when a node exists in only one learned model, the node is duplicated, and when nodes exist in corresponding positions in the multiple learned models, the corresponding nodes are integrated, thereby integrating the different learned models.

With such a configuration, a system in which learned models generated in the learning apparatus layer including one or more learning apparatuses can be integrated as appropriate through one or more learned model integrating apparatuses in the integrating apparatus layer, particularly a system suitable for large-scale learning/integration processing can be provided.

Advantageous Effects of Invention

According to the present disclosure, different learned models can be integrated using suitability for integration of learned models having tree structures, so that a single comprehensive learned model can be generated from multiple learned models.

DESCRIPTION OF EMBODIMENTS

One embodiment of integration processing apparatus according to the present invention will now be described in detail with reference to the accompanying drawings.

1. First Embodiment

<1.1 Apparatus Configuration>

Figure 1:
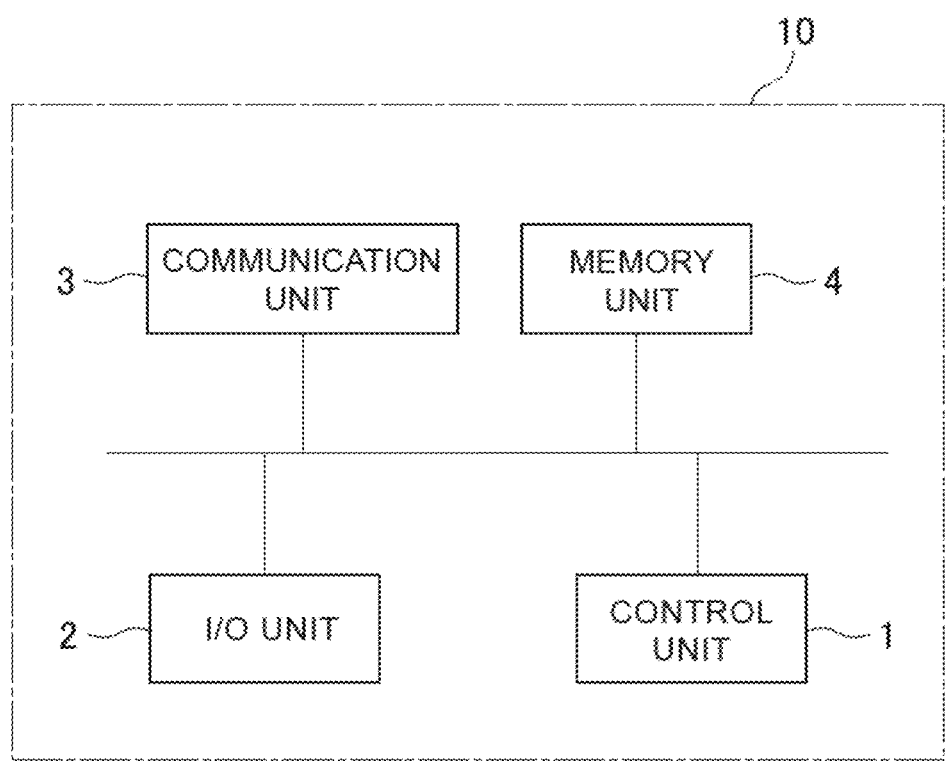
FIG. 1 is an explanatory diagram showing a hardware configuration.

FIG. 1 is an explanatory diagram showing the hardware configuration of an integration processing apparatus 10 according to this embodiment. As is clear from the drawing, the integration processing apparatus 10 includes a control unit 1, an I/O unit 2 for controlling input/output to/from an external device, a communication unit 3 for controlling wireless or wired communication, and a memory unit 4, which are connected to each other via a system bus. The control unit 1 consists of a CPU and executes various programs including a program for performing integration processing of a learned model having a tree structure which will be described later. Note that a microprocessor, a microcontroller, a graphics processing unit (GPU), or the like may be used instead of this CPU or the like. The memory unit 4 serves as various storage devices including a ROM, a RAM, a flash memory, and a hard disk, for example, and temporarily or non-temporarily stores various data related to a learned model having a tree structure, data corresponding to teaching data, and a program having a function of performing integration processing of a learned model, for example.

Note that the configuration of the integration processing apparatus 10 is not limited to the configuration shown in the drawing, but can be freely changed within the scope of technical common sense at the time of filing. Accordingly, for example, the memory unit 4 may be separately provided as an external storage or the like. Similarly, the control unit 1 may perform distribution processing or the like in cooperation with a control unit or the like in another information processing apparatus. Further, processing using a virtualization technique or the like may be performed.

<1.2 Operation of Apparatus>

<1.2.1 Learning Processing>

An example of learning processing for generating a learned model to be integrated through the integration processing apparatus 10 will be described with reference to FIGS. 2 to 3.

Figure 2:
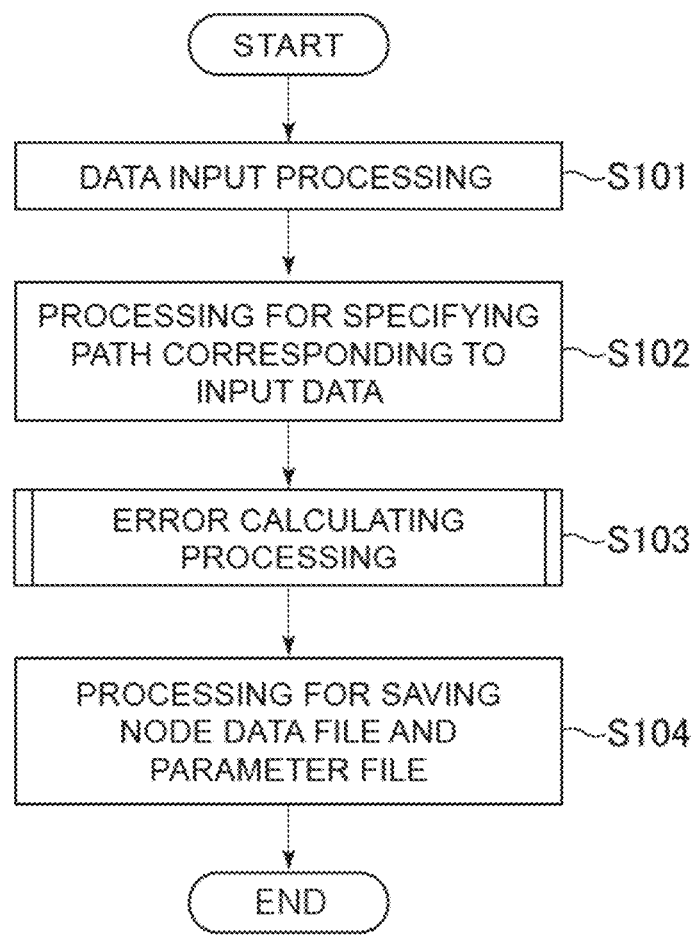
FIG. 2 is a general flow chart related to the learning processing.

FIG. 2 is a general flow chart related to the learning processing. Upon the start of the processing, data to be learned is first input to a learning model having a tree structure (S101). Next, for the input data, the state space to which the data should belong and the node corresponding to that state space are specified, so that one path between multiple nodes, that is, from the root node to the terminal node is specified (S102). At this time, if a node that has never become active in the past exists on the path, a new node is generated in the position. Afterwards, for each node on the path, processing for calculation of an error corresponding to the predicted error of each node is performed (S103).

Figure 3:
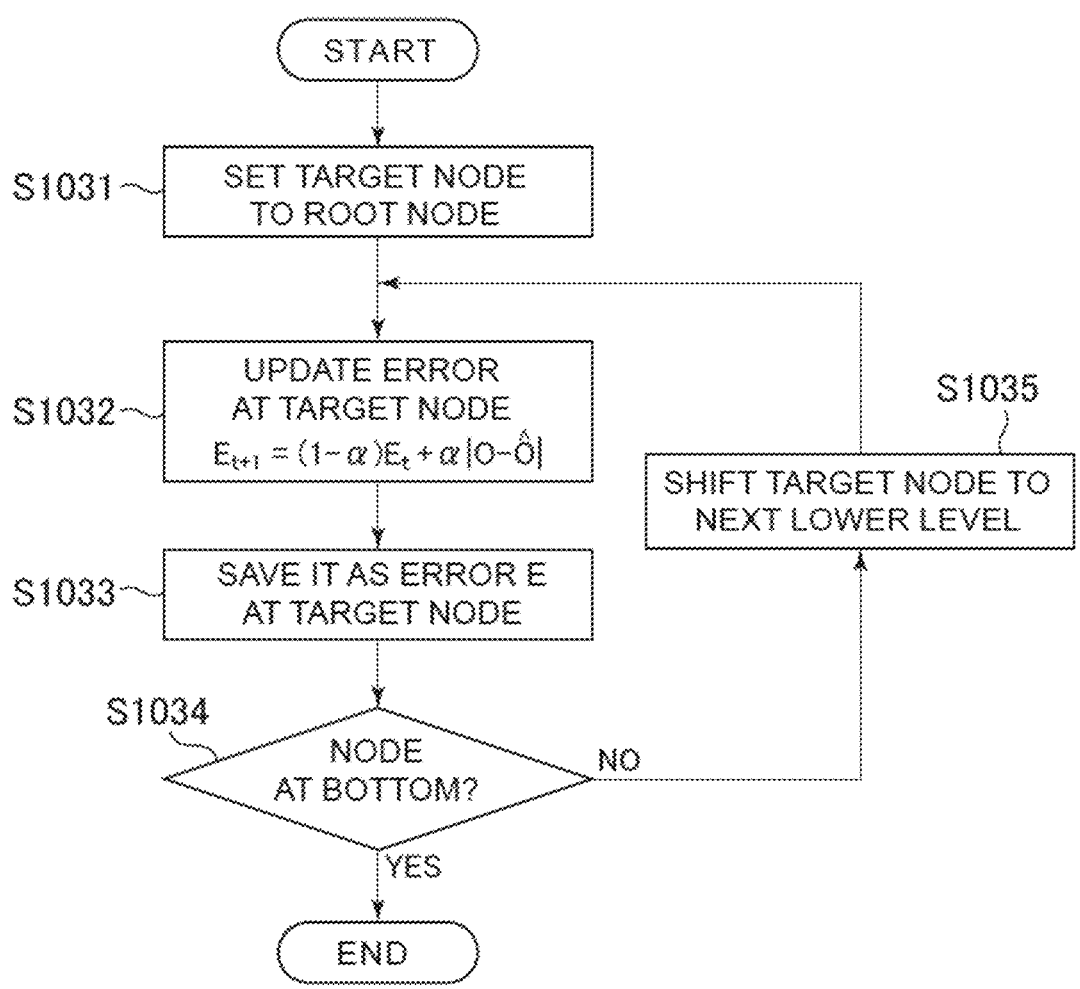
FIG. 3 is a flow chart related to error calculation processing.

FIG. 3 is a flow chart showing the details of the error calculation processing (S103). Upon the start of the processing, the root node is first set as a target node (S1031).

Next, for the target node, error updating processing is performed according to the following equation (S1032).

$$E_{t+1}=(1-\alpha)E_t+\alpha|\hat{O}-O| \quad \text{[Expression 1]}$$

Here, $E_{t+1}$ represents an updated error, $E_t$ represents a non-updated data, $\alpha$ represents the forgetting factor ($0<\alpha<1$). As is clear from the equation, the updated error $E_{t+1}$ is calculated by performing weighted addition, which uses a forgetting factor $\alpha$, on the non-updated error $E_t$ and the absolute value of a difference between a predicted output O (e.g., the arithmetic mean value of the value or vector of each piece of data included in the target node) based on the value or vector of each piece of data included in the target node and the value or vector corresponding to the teaching data. In other words, as the difference between the predicted output O based on the value or vector of each piece of data included in the target node and the value or vector corresponding to the teaching data decreases, $E_{t+1}$ decreases, which means that as the error $E_{t+1}$ decreases, higher prediction accuracy is obtained. The updated error $E_{t+1}$ is stored in the memory unit 4 as an error E in association with the target node (S1033).

Afterwards, determination processing for determining whether or not this target node is at the bottom (S1034). If the node is not at the bottom, processing for shifting the target node to the next lower level is performed (S1035). This series of processing including processing for shifting the node to the next lower level on the path of the target node (S1035), error updating processing (S1032), and storage processing (S1033) is repeated until it reaches a node at the bottom (NO in S1034). On the other hand, when the target node reaches the node at the bottom (terminal node) (YES in S1034), the processing ends. In other words, this series of processing generates an error E corresponding to prediction accuracy for each of all nodes on the path.

The method of calculating the error E is not limited to the above-described one. Accordingly, an error obtained, for example, by referring to a node present on the path at a level lower than that of the target node may be used, for example.

<1.2.2 Prediction Processing>

Figure 4:
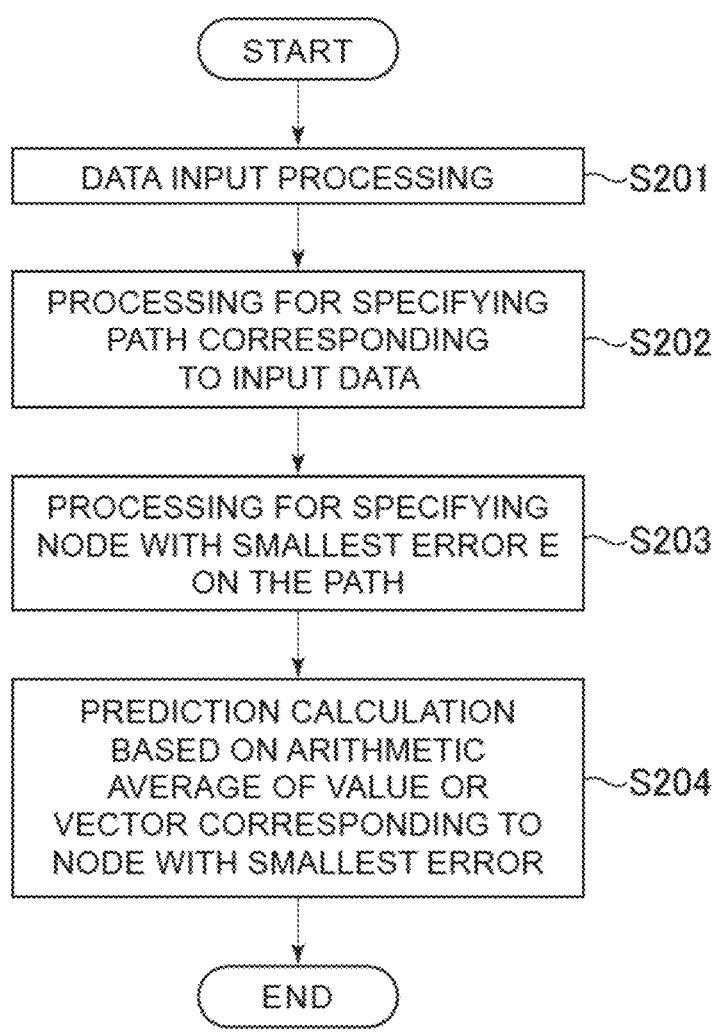
FIG. 4 is a flow chart related to prediction processing.

Next, an example of prediction processing using a learned model that has been subjected to the above-described learning processing will be described with reference to FIG. 4. FIG. 4 is a flow chart related to prediction processing. As is clear from the drawing, upon the start of processing, new input data is first read from the memory unit 4 (S201). Next, according to the input data, the state space (node) to which it should belong is specified, so that one path consisting of a series of nodes is specified (S202). When one path is specified, a node having the smallest error E on the path is specified (S203), and a predicted output is generated based on the arithmetic mean of the value or vector of each piece of data corresponding to the node with the minimum error E (S204). In other words, a prediction output is generated based on the node with the minimum error on the path. Thus, a predicted output can be generated based on the node predicted to have comparatively high prediction accuracy.

The predicted output is generated based on the data corresponding to the node with the minimum error on the path in this embodiment, but this is not the only way of processing. Accordingly, for example, a predicted output may be always generated based on the data corresponding to a terminal node.

<1.2.3 Processing for Integration of Multiple Learned Models>

Next, processing for integration of learned models using the integration processing apparatus 10 according to this embodiment will be described with reference to FIGS. 5 to 8.

Figure 5:
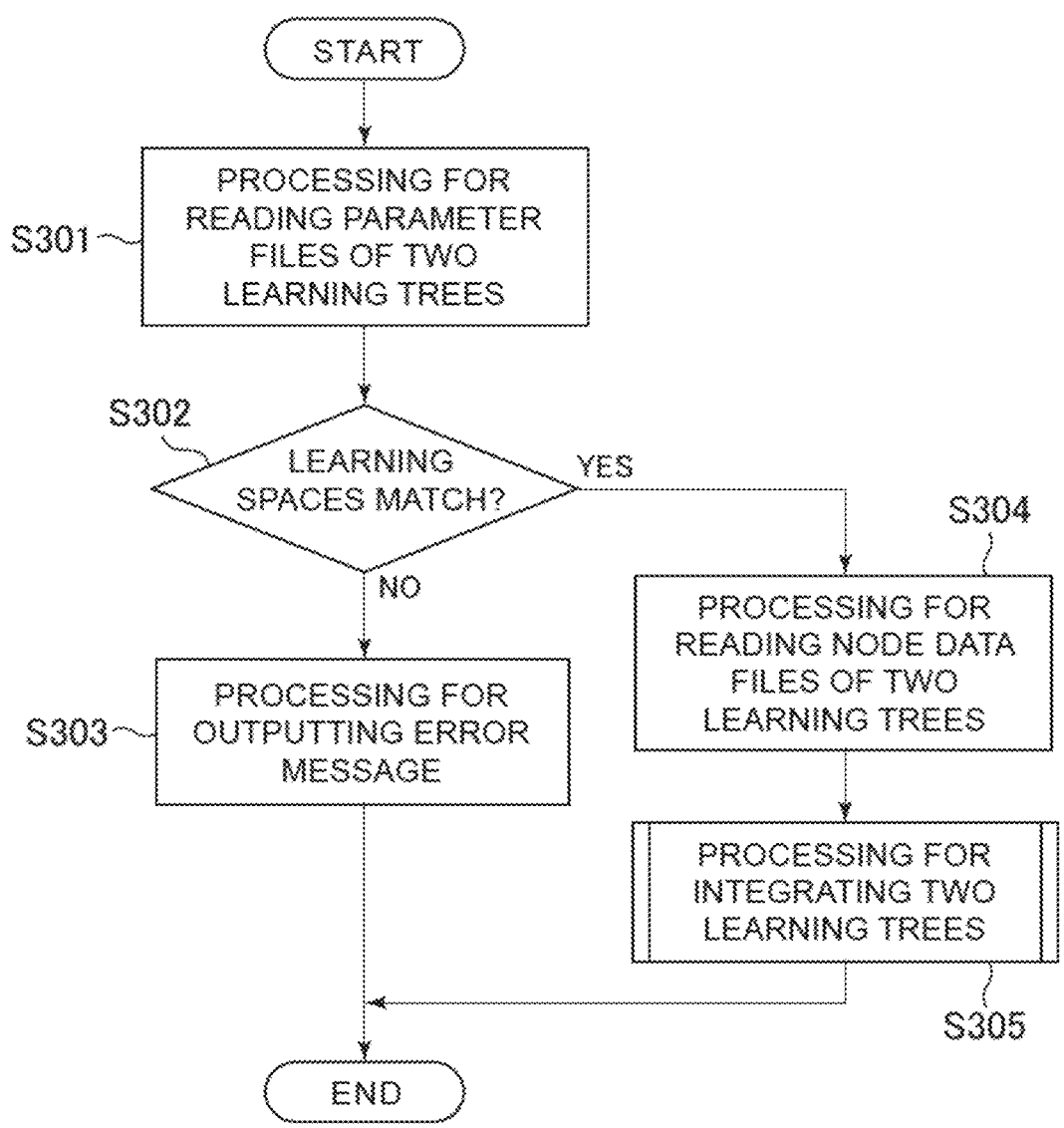
FIG. 5 is a general flow chart related to integration processing.

FIG. 5 is a general flow chart related to integration processing. Upon the start of the processing, for two different learned models, parameter files, which are generated when the learned models are generated, are read (S301). Each parameter file includes, for example, a value range (learning space) to be learned, that is, the maximum value and minimum value of input/output data, information about the structure of the learning model (N levels, d dimensions, and n divisions), and the like. Whether or not the learning sections match or roughly match is determined (S302). When they do not match (NO in S302), an error message notifying the user that integration cannot be performed is output through a display (not shown in the drawing) or the like (S303), and the processing ends. On the other hand, when the learning spaces match or roughly match, data files related to the nodes of the two learned models are read (S304). Afterwards, processing for integration of learning trees related to two different learned models, which will be described later, is performed (S305), and the processing then ends. Here, a rough match between learning sections refers to, for example, a situation in which, within a range in which a margin of a predetermined rate (e.g., about 10%) is given to the maximum value and minimum value of the data included in one of the learned models, the maximum value and minimum value of the data included in the other learned model are included.

Such a configuration enables preliminary determination of whether or not the learned models can be integrated based on predetermined parameters in the parameter files including parameters corresponding to the learning conditions, so that only appropriate integration processing that meets the preconditions for integration can be performed.

Figure 6:
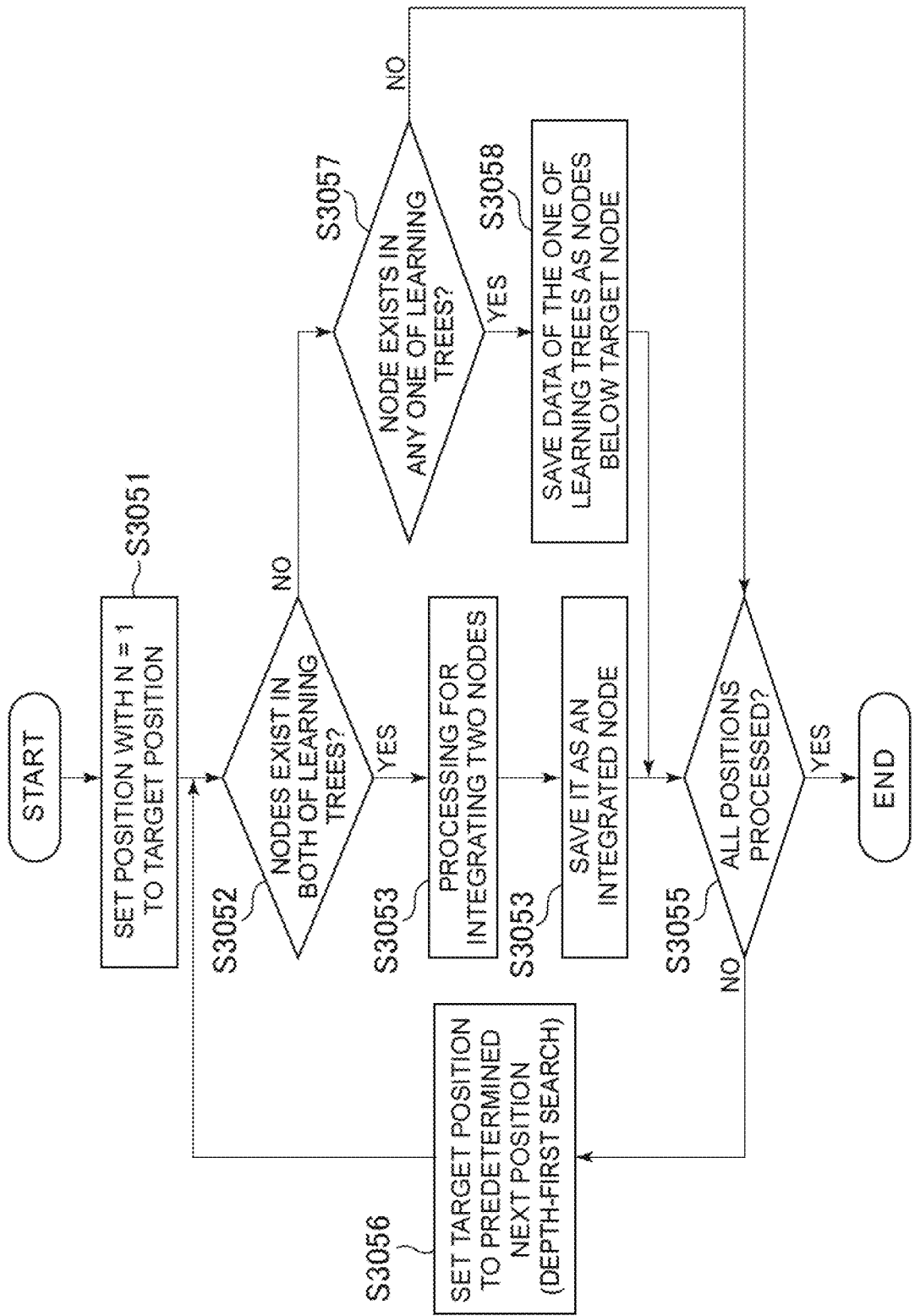
FIG. 6 is a detailed flow chart related to integration processing.

FIG. 6 is a detailed flow chart related to integration processing (S305). Upon the start of the processing, the first node position is set to a target node (S3051). Next, in the target position, determination processing is performed to determine whether a node exists in both of the learning trees (S3052). If the node exists in both of the learning trees (YES in S3052) in the target position, processing for integration of the two nodes is performed (S3053).

Figure 8:
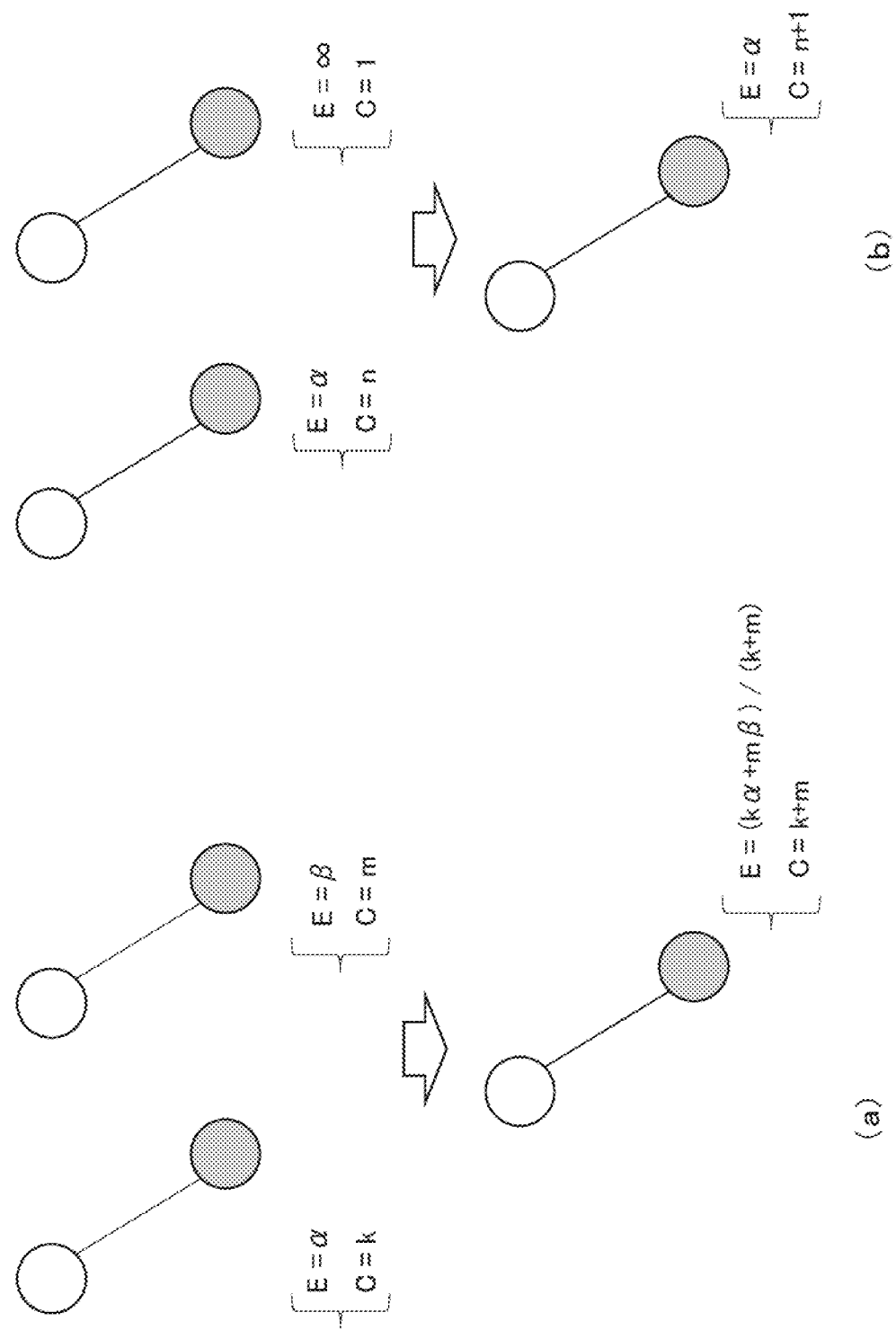
FIG. 8 is a conceptual diagram related to integration processing.

An aspect of node integration processing according to this embodiment will now be described. FIG. 8 is a conceptual diagram related to node integration processing (S3053). FIG. 8(*a*) is a first example of integration in which the two upper left-right colored nodes are integrated into one lower colored node. In the drawing, E represents the above-mentioned error, and C represents the number of pieces of data that has been included so far. The error E of the upper left node is $\alpha$ (>0), the number of pieces of data C is k (an integer greater than or equal to 0), the error E of the upper right node is $\beta$ (>0), and the number of pieces of data C is m (an integer greater than or equal to 0). When these nodes are integrated, the data associated with each node is integrated so as to be associated with one node. Further, the integrated error E is calculated by performing weighted addition, which uses the numbers of pieces of data k and m, on the above-described errors $\alpha$ and $\beta$. Furthermore, the number of pieces of data C after integration is calculated by adding up the numbers of pieces of data k and m.

With such a configuration, the nodes are integrated by weighted addition according to the number of pieces of included data, so that learning-related parameters can be integrated according to the reliability based on the number of pieces of data.

FIG. 8(*b*) is a second example of integration in which the two upper left-right colored nodes are integrated into one lower colored node. The error E of the upper left node is $\alpha$ (>0), the number of pieces of data C is n (an integer greater than or equal to 0), the error E of the upper right node is $\infty$, and the number of pieces of data C is one. Here, the error E is $\infty$ which is a value given for convenience because the number of pieces of data associated with the node is still one and the error is not defined. When these nodes are integrated, the data associated with the nodes are integrated so as to be associated with one node. Further, the error E after integration is calculated as $\alpha$ on the basis of the above-described errors $\alpha$ and $\infty$. Furthermore, the number of pieces of data C after integration is calculated as n+1 by adding up the numbers of pieces of data n and 1.

In this embodiment, the data associated with each node, the error E, and the number of pieces of data C are targets to be integrated during node integration processing. However, the integration targets are not limited to these parameters. Accordingly, it is a matter of course that during node integration, other parameters associated with the node may be targets to be integrated.

Referring back to FIG. 6, upon completion of the node integration processing (S3053), the integrated node is stored in the memory unit 4 (S3053). Afterwards, determination processing is performed for determining whether or not all node positions have been processed (S3055).

On the other hand, if not both of the learning trees include a node in the target position (NO in S3052), determination processing is then performed for determining whether or not a node exists in any one of the learning trees (S3057). If any one of the learning trees does not include a node (NO in S3057), determination processing is performed for determining whether or not all node positions have been processed (S3055). If there is a node in the target position of any one of the learning trees (YES in S3057), the node in the target position of data of the learning trees and the nodes below the target node are duplicated and saved as integrated data (S3058). Afterwards, determination processing is performed for determining whether or not all node positions have been processed (S3055).

With such a configuration, when a certain node exists only in one of the learned models, efficient integration processing can be performed taking advantage of the fact that the nodes below that node also exist only in the one of the learned models.

When processing has been performed for all the node positions (YES in S3055), the processing ends. On the other hand, if processing has not yet been performed for all the node positions (S3055), processing is performed for shifting the target position to a predetermined next node position (S3056), and the node integration processing (S3053) or processing for duplication of one of the nodes (S3058) and the like is performed again. At this time, the setting of the target position (depth-first search) is performed in order from the higher-level node position. This is because when nodes exist only in one of the learning trees (S3057), duplication of the nodes below the target node is performed (S3058), and it is therefore more efficient to search from higher-level node positions.

Figure 7:
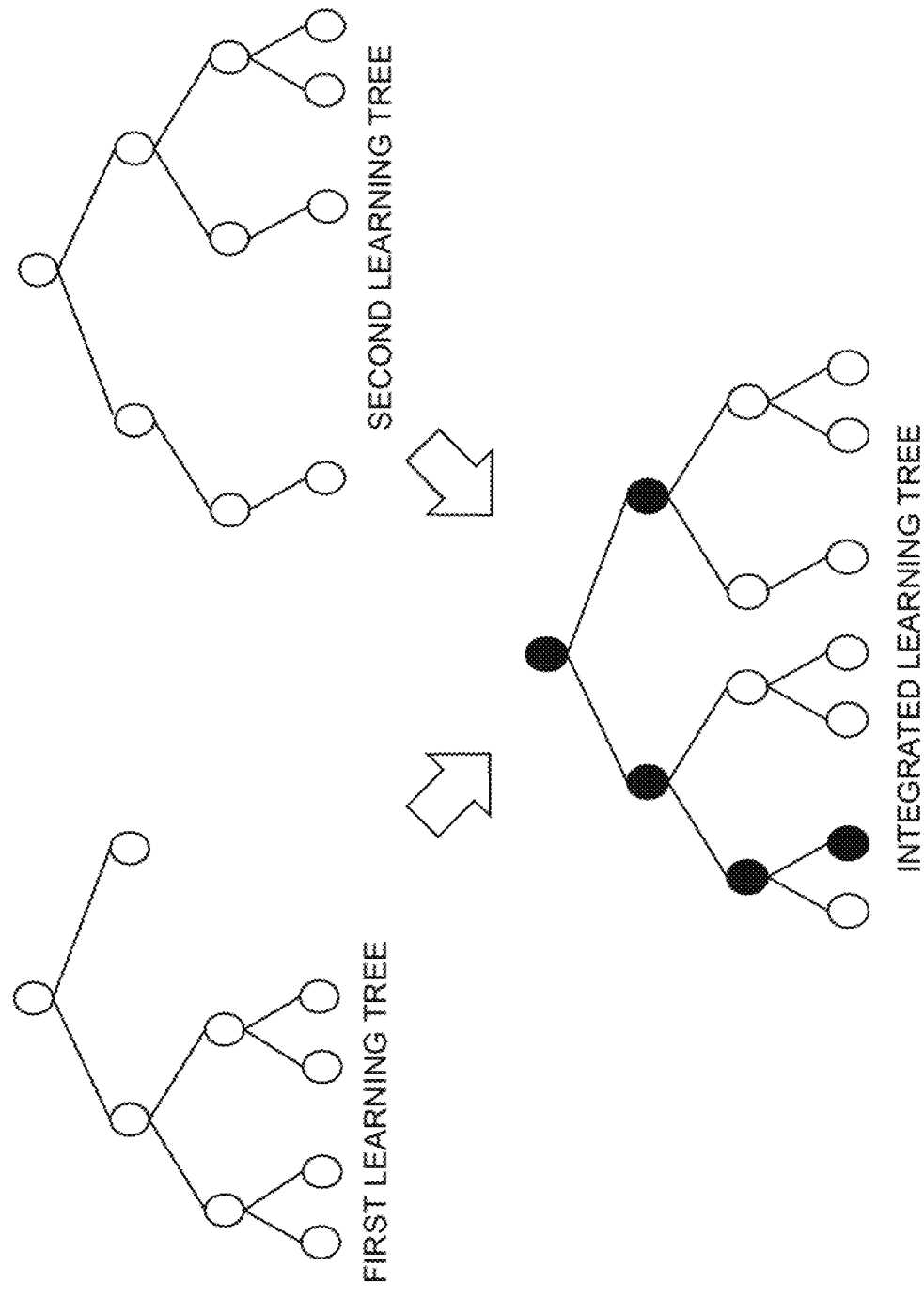
FIG. 7 is a conceptual diagram related to integration of learning trees.

FIG. 7 is a conceptual diagram related to integration of learning trees. As is clear from the drawing, when the first learning tree at the upper left of the drawing and the second learning tree at the upper right of the drawing are integrated, as shown in the bottom row of the drawing, integration processing is performed at the black nodes, whereas the nodes of the first learning tree or the second learning tree are duplicated at the white nodes.

<1.3 Experimental Results>

The experimental results of processing for integration of two learned models using the integration processing apparatus 10 according to this embodiment will now be described with reference to FIGS. 9 and 10.

<1.3.1 Experimental Results (Part 1)>

Figure 9:
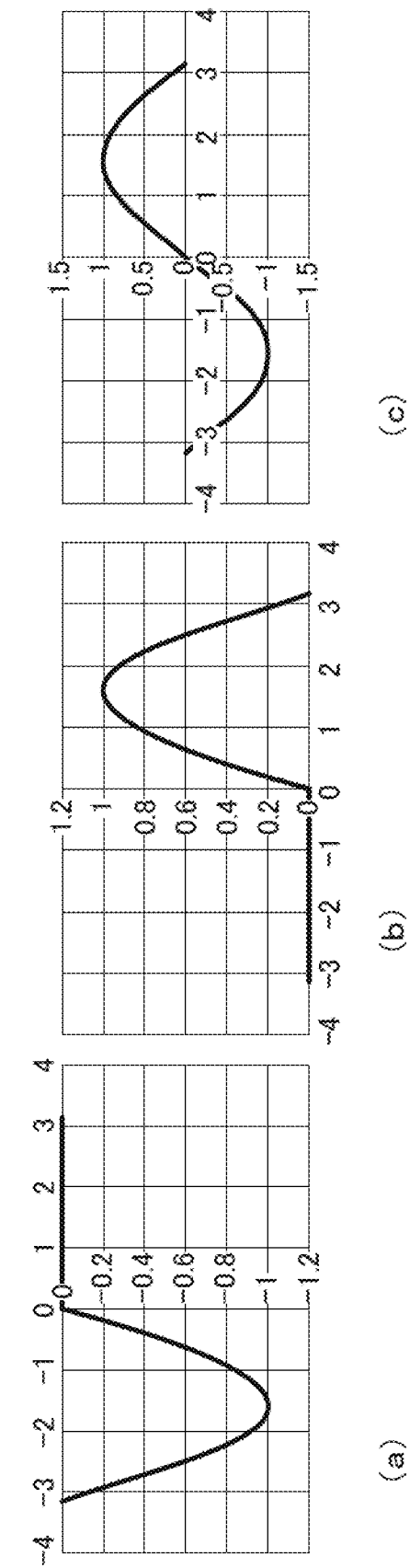
FIG. 9 shows experimental results (Part 1).

FIG. 9 shows the experimental results (Part 1) of processing for integration of two learned models. FIG. 9(*a*) shows the predicted output of the first learned model that has been made learn a sine curve for ½ period from −π to 0. On the other hand, FIG. 9(*b*) shows the predicted output of the second learned model that has been made learn a sine curve for ½ period from 0 to π. When these two learned models are integrated using the integration processing apparatus 10, they are integrated into a single learned model with the predicted output shown in FIG. 9(*c*). In other words, as is clear from these drawings, it is confirmed that integration for a half cycle from −7c to 0 and a half cycle from 0 to π enabled generation of a learned model in which a sine curve for one cycle from −π to π can be accurately predicted in its entire region.

<1.3.2 Experimental Results (Part 2)>

Figure 10:
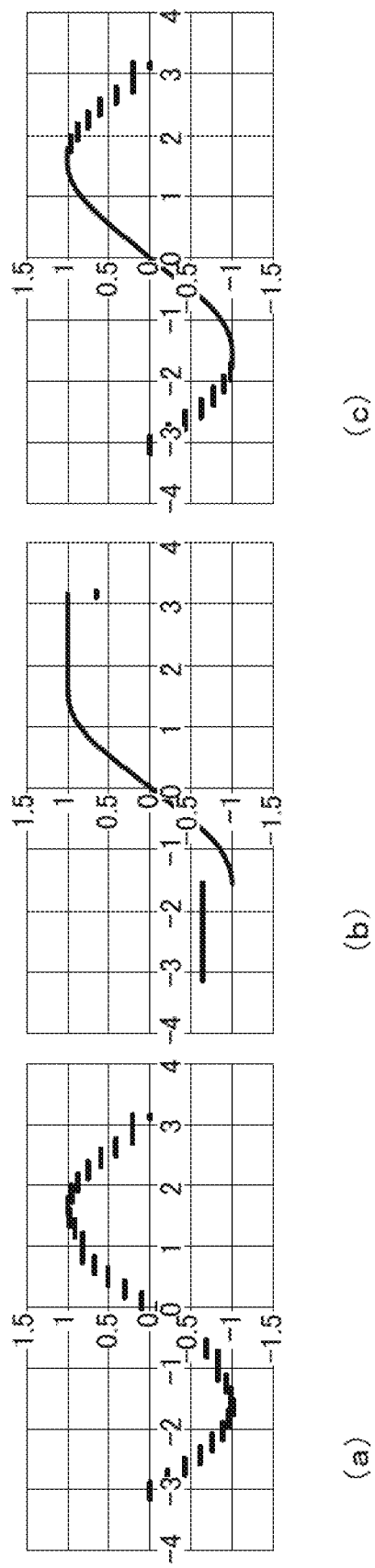
FIG. 10 shows experimental results (Part 2).

FIG. 10 shows the experimental results (Part 2) of processing for integration of two learned models. FIG. 10(*a*) shows the predicted output of the first learned model that has learned one period from −π to π with poor accuracy. On the other hand, FIG. 10(*b*) shows the predicted output of the second learned model that has learned a sine curve accurately in the range of −π/2 to π/2 but in such a manner that the separate line segments are substantially extended and parallel to the horizontal axis in the range of −π to −π/2 and the range of π/2 to π. When these two learned models are integrated using the integration processing apparatus 10, they are integrated into a single learned model with the predicted output shown in FIG. 10(*c*). In particular, the sine curve is roughly represented in the range of −π to −π/2, and the sine curve is accurately represented in the range of −π/2 to π/2, and the sine curve is roughly represented in the range of π/2 to π. Thus, it is confirmed that a learned model can be generated which accurately generates a predicted output in a range in which it has accurately learned, and generates a rough predicted output in a range in which it has roughly learned.

2. Others

Although processing for integrating two different learned models in a single integration processing apparatus 10 has been described in the above-described embodiment, the present disclosure is not limited to such a configuration. Accordingly, for example, it may be configured to be a large-scale integration processing system.

Figure 11:
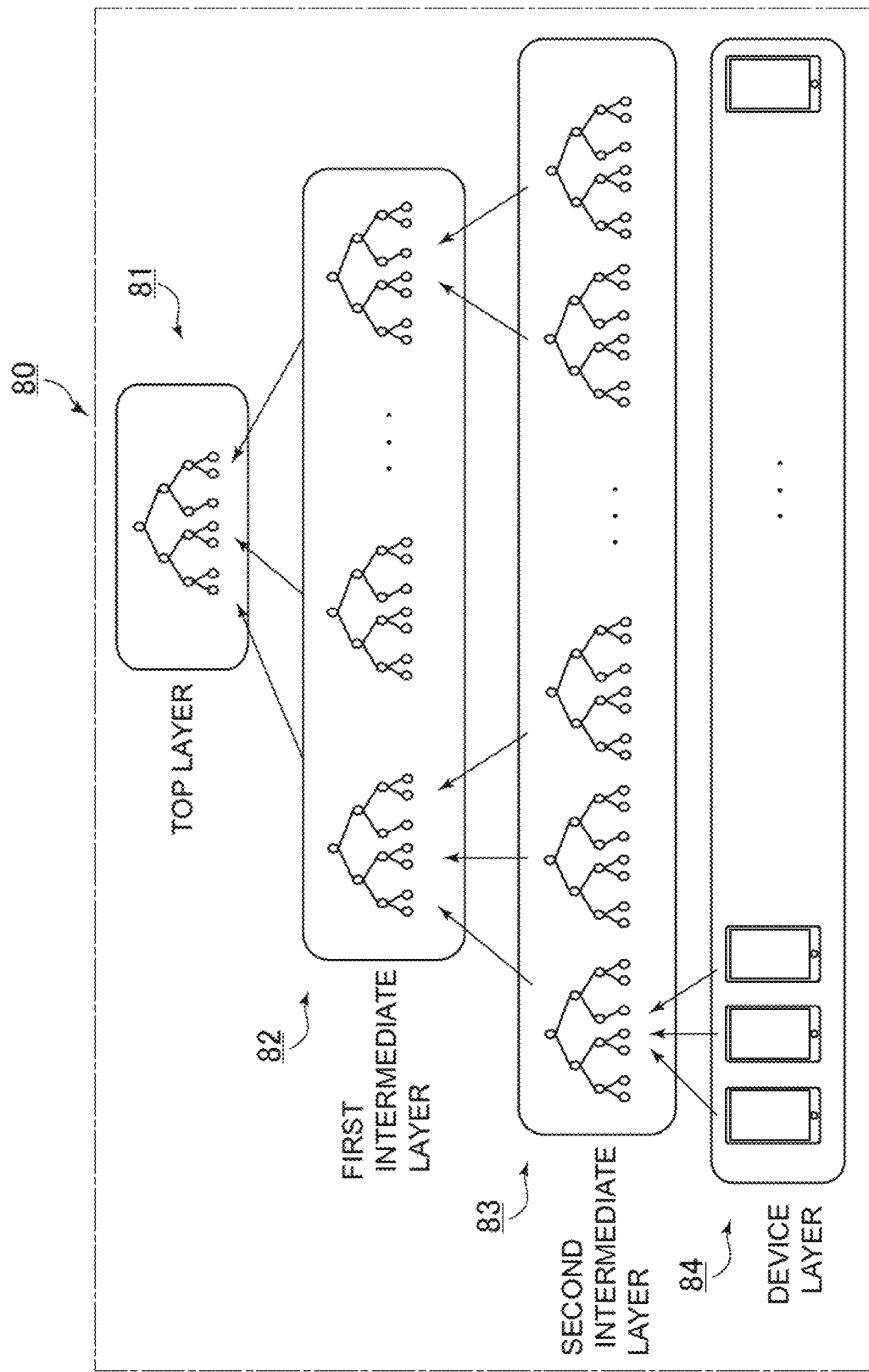
FIG. 11 is a schematic configuration diagram of a large-scale integration processing system.

FIG. 11 is a schematic configuration diagram of a large-scale integration processing system 80. As is clear from the drawing, the large-scale integration processing system 80 includes, from the top, a top layer 81 including one or more integration processing apparatuses 10, a first intermediate layer 82 including one or more integration processing apparatuses 10, a second intermediate layer 83 including one or more learning processing apparatuses, and a device layer 84 including multiple devices, and these layers are connected to each other by wired or wireless communication.

Data to be learned (e.g., sensor data) acquired by each device in the device layer 84 is transmitted to the second intermediate layer 83, and in the second intermediate layer 83, learning processing is performed on learning models having a tree structure according to the data. As a result of this learning process, multiple learned models are generated in the second intermediate layer 83. The first intermediate layer receives data on the learned models in the second intermediate layer and performs processing for integration of each learned model. Consequently, multiple integrated learned models are generated in the first intermediate layer 82. The data on the learned models in the first intermediate layer 82 is then transmitted to the top layer, and integration processing is performed again in the integration processing apparatus in the top layer. With the above-described configuration, even in a large-scale system, the load of learning processing or integration processing in each layer is small, and a comprehensive learned model is generated in the top layer 81.

With such a configuration, a system in which learned models generated in the learning apparatus layer (the second intermediate layer) including one or more learning apparatuses can be integrated as appropriate through one or more learned model integrating apparatuses in the integrating apparatus layer (the top layer 81 or the first intermediate layer 82), particularly a system suitable for large-scale learning/integration processing can be provided.

In the above-described embodiment, the processing for integration of learned models is always performed in the integration processing apparatus 10. However, the present disclosure is not limited to the such a configuration. Accordingly, for example, it may be configured to be an information processing system (server client system or SaaS system) consisting of a server apparatus 40 and a client apparatus 30.

Figure 12:
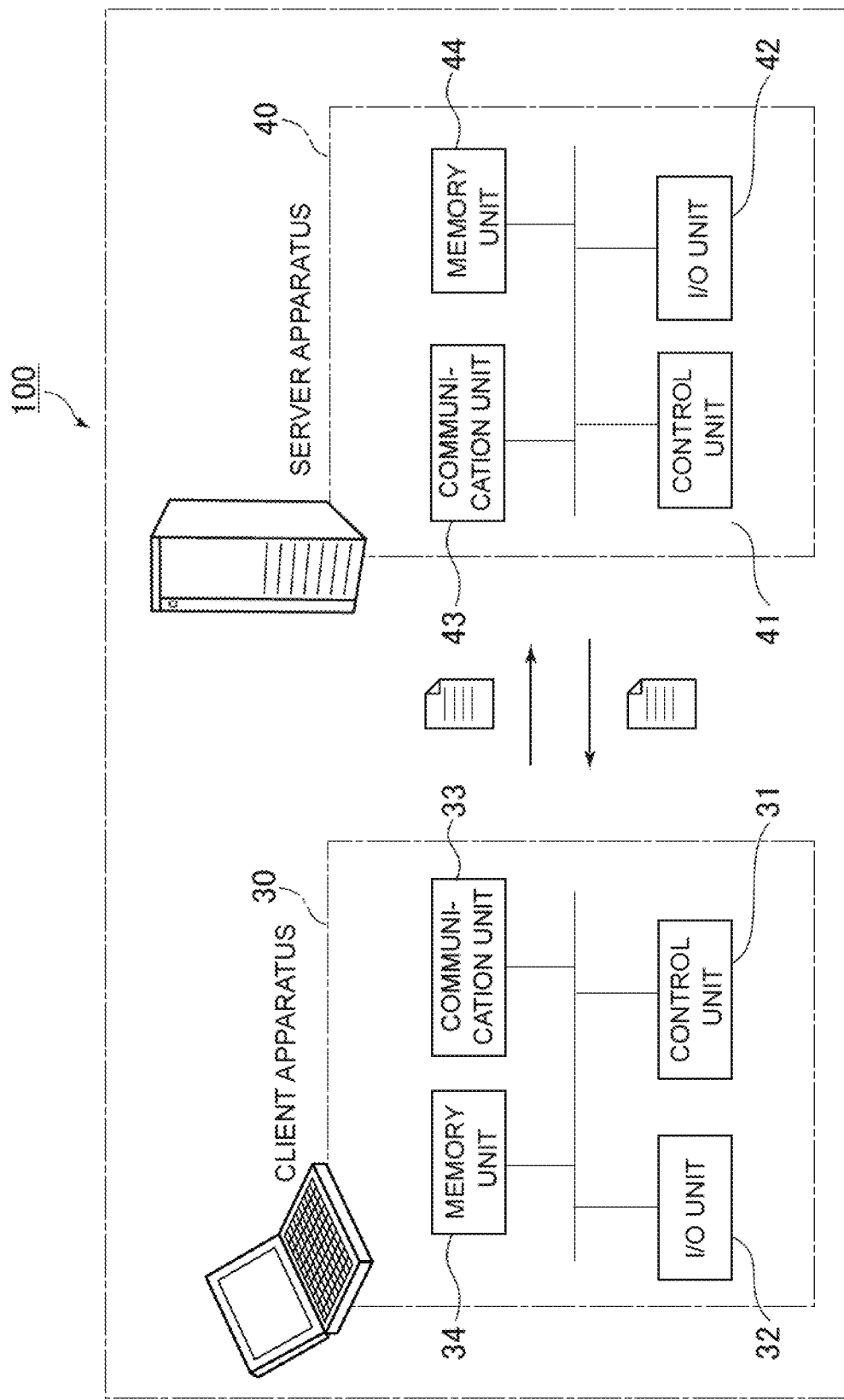
FIG. 12 is a schematic configuration diagram of an information processing system.
Figure 13:
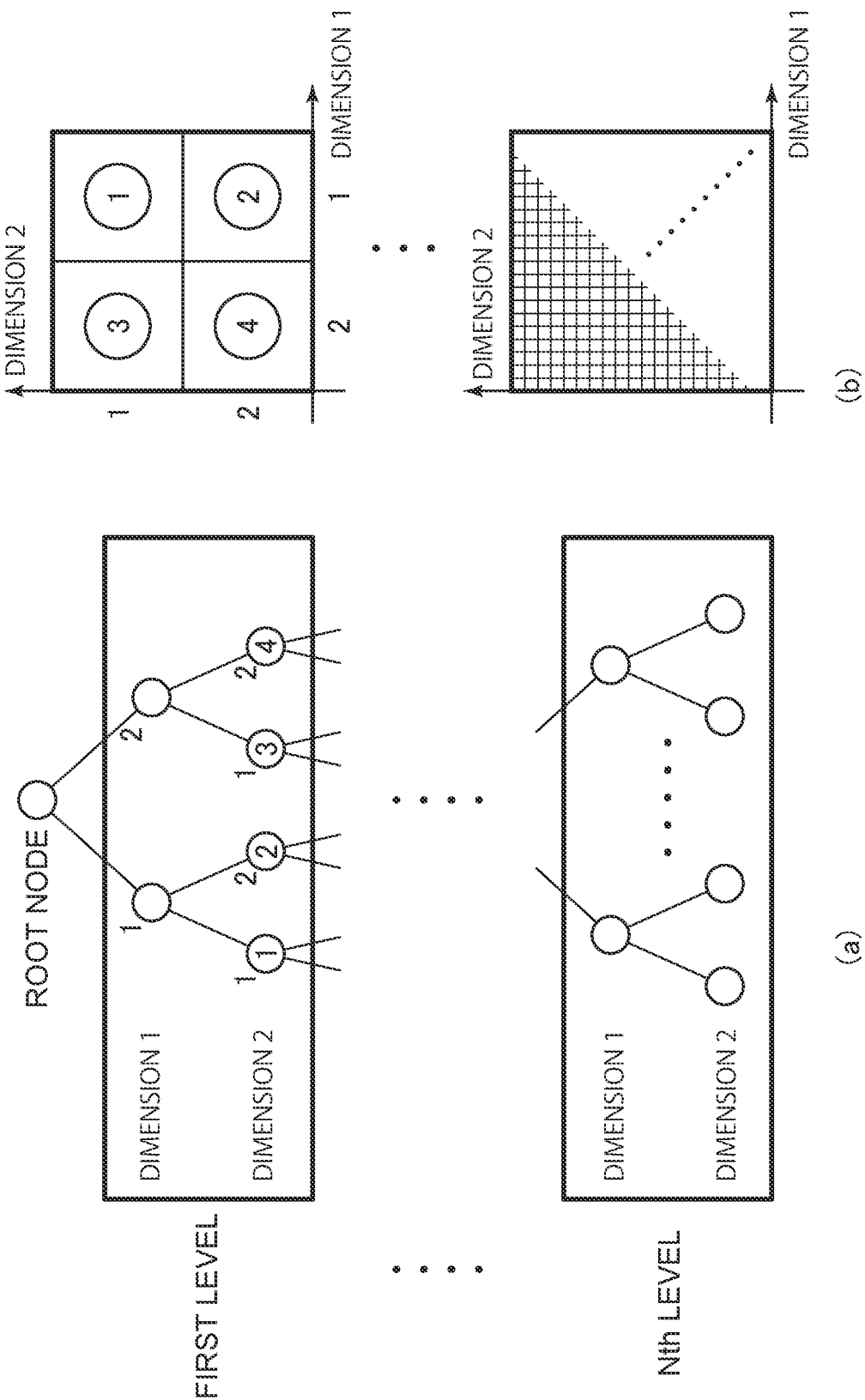
FIG. 13 is an explanatory diagram showing the structure of a learning tree.

FIG. 12 is a schematic configuration diagram of the information processing system 100. The client apparatus 30 consists of a control unit 31 for controlling the client apparatus 30, an I/O unit 32 for input and output operations, a communication unit 33 for communicating with the server apparatus 40, and a memory unit 34 for storing various kinds of information. The server apparatus 40 consists of a control unit 41 for controlling the server apparatus 40, an I/O unit 42 for input and output operations, a communication unit 43 for communicating with the client apparatus 30, and a memory unit 44 for storing various kinds of information.

In such an information processing system 100, when the user transmits a data file to be learned from the client apparatus 30 to the server apparatus 40, the server apparatus 40 executes learning processing based on the data file. Upon completion of the learning processing, the server apparatus 40 returns the parameter file including the learning conditions (e.g., input/output dimensions and various parameters) and the data file related to the learned model as a binary file to the user.

Afterwards, the user transmits multiple (e.g., two) different parameter files and data files to the server apparatus 40 and also issues an integration processing instruction to the server apparatus 40 via communication, allowing the user to perform data integration processing on the server apparatus 40. With such a configuration, the client apparatus 30 is not required to have high computing power and storage capability, thereby facilitating learning processing or integration processing.

INDUSTRIAL APPLICABILITY

It can be used in the industry for, for example, manufacturing a learned model integration method, apparatus, program, IC chip, and system for performing integration processing of learned models generated by predetermined learning processing, particularly a learned model integration method, apparatus, program, IC chip, and system for performing integration of learned models having tree structures.

REFERENCE SIGNS LIST

1 Control unit
2 I/O unit
3 Communication unit
4 Memory unit
10 Integration processing apparatus
30 Client apparatus
31 Control unit
32 I/O unit
33 Communication unit
34 Memory unit
40 Server apparatus
41 Control unit
42 I/O unit
43 Communication unit
44 Memory unit
80 Large-scale integration processing system
81 Top layer
82 First intermediate layer
83 Second intermediate layer
84 Device layer
100 Information processing system (server client system)

What is claimed is:

1. A learned model integration method for integrating multiple different learned models, each of the multiple different learned models obtained by letting a learning model learn a predetermined data group, the learning model comprising a tree structure in which multiple nodes associated with respective hierarchically divided state spaces are hierarchically arranged, the method comprising:
reading data related to the multiple different learned models, each learned model individually comprising a tree structure, from a predetermined memory; and
integrating the multiple different learned models into a single learned model:
by copying, into the single learned model, a node constituting a tree structure related to the multiple different learned models when the node exists in only one learned model, and
by integrating nodes constituting a tree structure related to the multiple different learned models when the nodes exist in corresponding positions in the multiple learned models, and
wherein in the integrating, when a node exists in only one learned model, the node and all the nodes below that node are duplicated; and
wherein
the data reading further comprises reading a parameter file including parameters corresponding to learning conditions of the learned models, and
the learned model integration method further comprises determining in which when predetermined parameters among the parameters corresponding to the respective learning conditions match, the integrating is performed, and when the predetermined parameters do not match, the integrating is not performed.

2. The learned model integration method according to claim 1, wherein
each node of the multiple different learned models is associated with a learning-related parameter generated in the process of the learning, and the number of pieces of data included in a state space corresponding to each node, and
the integrating further comprises:
adding, for integration of the nodes, the numbers of pieces of data related to multiple nodes to be integrated, and
error amount adding of performing, for integration of the nodes, weighted addition on the learning-related parameters associated with multiple nodes to be integrated, according to the numbers of pieces of data.

3. The learned model integration method according to claim 2, wherein the learning-related parameter is generated in the process of the learning for each node and is an error amount corresponding to prediction accuracy.

4. A learned model integrating apparatus for integrating multiple different learned models, each of the multiple different learned models obtained by letting a learning model learn a predetermined data group, the learning model comprising a tree structure in which multiple nodes associated with respective hierarchically divided state spaces are hierarchically arranged, the apparatus comprising:
a predetermined memory; and
a processor:
to read data related to the multiple different learned models, each learned model individually comprising a tree structure, from the predetermined memory; and
to integrate the multiple different learned models into a single learned model:
by copying, into the single learned model, a node constituting a tree structure related to the multiple different learned models when the node exists in only one learned model, and
by integrating nodes constituting a tree structure related to the multiple different learned models when the nodes exist in corresponding positions in the multiple learned models, and
wherein in the integrating, when a node exists in only one learned model, the node and all the nodes below that node are duplicated; and
wherein
the to read data further comprises reading a parameter file including parameters corresponding to learning conditions of the learned models, and
the learned model integrating apparatus is further configured to determine in which when predetermined parameters among the parameters corresponding to the respective learning conditions match, the integrating is performed, and when the predetermined parameters do not match, the integrating is not performed.

5. A non-transitory computer readable storage medium encoded with computer readable instructions, which, when executed by processor circuitry, causes the processor circuitry to perform a method for making a computer function as a learned model integrating apparatus for integrating multiple different learned models, each of the multiple different learned models obtained by letting a learning model learn a predetermined data group, the learning model comprising a tree structure in which multiple nodes associated with respective hierarchically divided state spaces are hierarchically arranged, the method comprising:
reading data related to the multiple different learned models, each learned model individually comprising a tree structure, from a predetermined memory; and
integrating the multiple different learned models into a single learned model:

by copying, into the single learned model, a node constituting a tree structure related to the multiple different learned models when the node exists in only one learned model, and by integrating nodes constituting a tree structure related to the multiple different learned models when the nodes exist in corresponding positions in the multiple learned models, and wherein in the integrating, when a node exists in only one learned model, the node and all the nodes below that node are duplicated; and wherein the data reading further comprises reading a parameter file including parameters corresponding to learning conditions of the learned models, and the method further comprises determining in which when predetermined parameters among the parameters corresponding to the respective learning conditions match, the integrating is performed, and when the predetermined parameters do not match, the integrating is not performed.

6. An IC chip comprising a function of integrating multiple different learned models, each of the multiple different learned models obtained by letting a learning model learn a predetermined data group, the learning model comprising a tree structure in which multiple nodes associated with respective hierarchically divided state spaces are hierarchically arranged, the IC chip comprising:

a predetermined memory;

a data reader configured to read data related to the multiple different learned models, each learned model individually comprising a tree structure, from the predetermined memory; and an integrator configured to integrate the multiple different learned models into a single learned model:

by copying, into the single learned model, a node constituting a tree structure related to the multiple different learned models when the node exists in only one learned model, and by integrating nodes constituting a tree structure related to the multiple different learned models when the nodes exist in corresponding positions in the multiple learned models, and wherein in the integrating, when a node exists in only one learned model, the node and all the nodes below that node are duplicated; and wherein the data reader further comprises reading a parameter file including parameters corresponding to learning conditions of the learned models, and the IC chip further determining in which when predetermined parameters among the parameters corresponding to the respective learning conditions match, the integrating is performed, and when the predetermined parameters do not match, the integrating is not performed.

7. An integration processing system comprising:

a learning apparatus layer including one or more learning apparatuses for performing learning processing based on a predetermined data group according to a learning model comprising a tree structure in which multiple nodes associated with respective hierarchically divided state spaces are hierarchically arranged, thereby generating learned models; and an integration apparatus layer including one or more learned model integrating apparatuses that are connected to the learning apparatus layer via communication and integrate the learned models generated in the learning apparatuses, the learned model integrating apparatus comprising:

a predetermined memory; and a processor:

to read data related to multiple different learned models, each learned model individually comprising a tree structure, from the predetermined memory; and to integrate the multiple different learned models into a single learned model:

by copying, into the single learned model, a node constituting a tree structure related to the multiple different learned models when the node exists in only one learned model, and by integrating nodes constituting a tree structure related to the multiple different learned models when the nodes exist in corresponding positions in the multiple learned models, and wherein in the integrating, when a node exists in only one learned model, the node and all the nodes below that node are duplicated; and wherein the to read data further comprises reading a parameter file including parameters corresponding to learning conditions of the learned models, and the learned model integrating apparatus is further configured to determine in which when predetermined parameters among the parameters corresponding to the respective learning conditions match, the integrating is performed, and when the predetermined parameters do not match, the integrating is not performed.

8. A learned model integrating apparatus for integrating multiple different learned models, each of the multiple different learned models obtained by letting a learning model learn a predetermined data group, the learning model comprising a tree structure in which multiple nodes associated with respective hierarchically divided state spaces are hierarchically arranged, the apparatus comprising:

a predetermined memory; and a processor, and wherein data related to the multiple different learned models, each learned model individually comprising a tree structure, from the predetermined memory is read by the processor;

wherein, by the processor, the multiple different learned models are integrated into a single learned model:

by copying, into the single learned model, a node constituting a tree structure related to the multiple different learned models when the node exists in only one learned model, and by integrating nodes constituting a tree structure related to the multiple different learned models when the nodes exist in corresponding positions in the multiple learned models, and wherein in the integrating, when a node exists in only one learned model, the node and all the nodes below that node are duplicated; and wherein the data further comprises a parameter file including parameters corresponding to learning conditions of the learned models, and the learned model integrating apparatus is further configured to determine in which when predetermined parameters among the parameters corresponding to the respective learning conditions match, the integrating is performed, and when the predetermined parameters do not match, the integrating is not performed.

* * * * *